United States Patent
Howard et al.

(10) Patent No.: US 7,824,805 B2
(45) Date of Patent: Nov. 2, 2010

(54) IMPLANTABLE MEDICAL DEVICE BATTERY

(75) Inventors: William G. Howard, Roseville, MN (US); Kaimin Chen, Shoreview, MN (US); Gaurav Jain, Minneapolis, MN (US); Craig L. Schmidt, Eagan, MN (US); Erik R. Scott, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 548 days.

(21) Appl. No.: 11/623,962

(22) Filed: Jan. 17, 2007

(65) Prior Publication Data
US 2007/0178381 A1    Aug. 2, 2007

Related U.S. Application Data

(60) Provisional application No. 60/759,309, filed on Jan. 17, 2006.

(51) Int. Cl.
*H01M 4/58* (2010.01)
*H01M 4/54* (2006.01)

(52) U.S. Cl. ............... 429/231.7; 429/219; 429/231.2; 429/231.5

(58) Field of Classification Search ............ 429/231.7, 429/219, 231.5, 231.2
See application file for complete search history.

(56) References Cited

U.S. PATENT DOCUMENTS

| | | | |
|---|---|---|---|
| 4,310,609 A | 1/1982 | Liang et al. | |
| 4,391,729 A | 7/1983 | Liang et al. | |
| 4,964,877 A | 10/1990 | Keister et al. | |
| 5,017,444 A | 5/1991 | Nakajima et al. | |
| 5,147,737 A | 9/1992 | Post et al. | |
| 5,154,992 A | 10/1992 | Berberick et al. | |
| 5,175,066 A | 12/1992 | Hamwi et al. | |
| 5,180,642 A | 1/1993 | Weiss et al. | |
| 5,221,453 A | 6/1993 | Crespi | |
| 5,250,373 A | 10/1993 | Muffoletto et al. | |
| 5,260,145 A | 11/1993 | Armand et al. | |
| 5,273,840 A | 12/1993 | Dominey | |
| 5,306,581 A | 4/1994 | Taylor et al. | |
| 5,312,458 A | 5/1994 | Muffoletto et al. | |
| 5,434,017 A | 7/1995 | Berkowitz et al. | |
| 5,437,692 A | 8/1995 | Dasgupta et al. | |

(Continued)

FOREIGN PATENT DOCUMENTS

EP    0 885 874 A1    12/1998

(Continued)

OTHER PUBLICATIONS

Lam et al, J. Power Sources (Online at www.sciencedirect.com), Jun. 27, 2005, pp. 354-359, vol. 153, 2006. Physical characteristics and rate performance of $(CFx)n$ ($0.33<x<0.66$) in lithium batteries.

(Continued)

*Primary Examiner*—Patrick Ryan
*Assistant Examiner*—Thomas H. Parsons
(74) *Attorney, Agent, or Firm*—Carol F. Barry

(57) ABSTRACT

A battery cell in an implantable medical device is presented. The battery cell includes an anode, a cathode, an insulator therebetween, and an electrolyte. The cathode includes silver vanadium oxide and fluorinated carbon (CFx). The CFx includes fluorine at greater than or equal to 61 percentage (%) by weight.

32 Claims, 11 Drawing Sheets

U.S. PATENT DOCUMENTS

| | | |
|---|---|---|
| 5,439,760 A | 8/1995 | Howard et al. |
| 5,468,569 A | 11/1995 | Pyszczek et al. |
| 5,472,810 A | 12/1995 | Takeuchi et al. |
| 5,498,494 A | 3/1996 | Takeuchi et al. |
| 5,549,717 A | 8/1996 | Takeuchi et al. |
| 5,558,680 A | 9/1996 | Takeuchi et al. |
| 5,677,086 A | 10/1997 | Satoh et al. |
| 5,695,892 A | 12/1997 | Leising et al. |
| 5,716,729 A | 2/1998 | Sunderland et al. |
| 5,744,258 A | 4/1998 | Bai et al. |
| 5,753,317 A * | 5/1998 | Law et al. .......... 427/487 |
| 5,753,389 A | 5/1998 | Gan et al. |
| 5,766,797 A | 6/1998 | Crespi et al. |
| 5,776,635 A | 7/1998 | Gan et al. |
| 5,895,733 A | 4/1999 | Crespi et al. |
| 5,955,218 A | 9/1999 | Crespi et al. |
| 5,962,720 A | 10/1999 | Gan et al. |
| 6,006,133 A | 12/1999 | Lessar et al. |
| 6,017,656 A | 1/2000 | Crespi et al. |
| 6,057,062 A | 5/2000 | Gan et al. |
| 6,093,506 A | 7/2000 | Crespi et al. |
| 6,130,005 A | 10/2000 | Crespi et al. |
| 6,136,477 A | 10/2000 | Gan et al. |
| 6,150,057 A | 11/2000 | Takeuchi |
| 6,153,338 A | 11/2000 | Gan et al. |
| 6,174,629 B1 | 1/2001 | Gan et al. |
| 6,180,283 B1 | 1/2001 | Gan et al. |
| 6,200,701 B1 | 3/2001 | Gan et al. |
| 6,203,942 B1 | 3/2001 | Gan et al. |
| 6,210,839 B1 | 4/2001 | Gan et al. |
| 6,221,534 B1 | 4/2001 | Takeuchi et al. |
| 6,265,106 B1 | 7/2001 | Gan et al. |
| 6,274,269 B1 | 8/2001 | Gan et al. |
| 6,350,542 B1 | 2/2002 | Gan et al. |
| 6,350,546 B1 | 2/2002 | Gan et al. |
| 6,403,256 B1 | 6/2002 | Gan et al. |
| 6,444,360 B2 | 9/2002 | Gan et al. |
| 6,451,483 B1 | 9/2002 | Probst et al. |
| 6,495,285 B2 | 12/2002 | Gan et al. |
| 6,551,747 B1 | 4/2003 | Gan |
| 6,630,272 B1 | 10/2003 | Iwamoto et al. |
| 6,783,888 B2 | 8/2004 | Gan et al. |
| 2002/0012844 A1 | 1/2002 | Gan et al. |
| 2004/0029005 A1 | 2/2004 | Leising et al. |
| 2004/0161671 A1 | 8/2004 | Merritt et al. |
| 2005/0117276 A1 | 6/2005 | Liu et al. |
| 2005/0180094 A1 | 8/2005 | Muffoletto et al. |
| 2006/0166078 A1 | 7/2006 | Chen et al. |
| 2007/0077488 A1 | 4/2007 | Chen et al. |
| 2007/0176151 A1 | 8/2007 | Chen et al. |
| 2007/0178371 A1 | 8/2007 | Merritt et al. |
| 2007/0178378 A1 | 8/2007 | Merritt et al. |
| 2007/0275284 A1 | 11/2007 | Merritt et al. |
| 2009/0181302 A1 | 7/2009 | Chen et al. |

FOREIGN PATENT DOCUMENTS

| | | |
|---|---|---|
| EP | 0 918 364 A1 | 5/1999 |
| EP | 1 109 244 A2 | 6/2001 |
| EP | 1156541 A | 11/2001 |
| EP | 0 885 874 B1 | 3/2002 |
| EP | 0 918 364 B1 | 3/2002 |
| EP | 1207568 A | 5/2002 |
| EP | 1 156 541 A3 | 3/2003 |
| EP | 1313159 A | 5/2003 |
| EP | 1 331 683 A2 | 7/2003 |
| EP | 1 331 683 A3 | 8/2005 |
| WO | WO 2004/075332 | 9/2004 |

OTHER PUBLICATIONS

Hany et al, J. Power Sources, Mar. 31, 1997. pp. 708-710, vol. 68, 1997. Low-temperature carbon fluoride for high power density lithium primary batteries.

International Search Report, PCT/US2007/060627, May 18, 2007, 6 Pages.

Norton et al., "Resistance Modeling of Lithium-Silver Vanadium Oxide Batteries," *Proceedings of the Symposium on Batteries for Portable Applications and Electric Vehicles*, vol. 97-18, Pennington, NJ, 1997;389-397.

Schmidt et al., "Mass transport limitation in implantable defibrillator batteries," *Journal of Power Sources*, 2003;119-121:979-985.

U.S. Appl. No. 12/683,514, filed Jan. 7, 2010, Merritt et al.

"Carbofluor CFx" datasheet online. Advance Research Chemicals, Catoosa, OK, copyright 2009; retrieved on Jan. 21, 2010. Retrieved from the Internet<URL:http://www.fluoridearc.com/cfx.htm>; 1 pg.

* cited by examiner

IMPLANTABLE MEDICAL DEVICE BATTERY

RELATED APPLICATION

This application claims priority to U.S. Provisional Application Ser. No. 60/759,309, filed Jan. 17, 2006.

FIELD OF THE INVENTION

The present invention generally relates to an electrochemical cell and, more particularly, to a battery for an implantable medical device.

BACKGROUND OF THE INVENTION

Implantable medical devices (IMDs) detect and deliver therapy for a variety of medical conditions in patients. IMDs include implantable pulse generators (IPGs) or implantable cardioverter-defibrillators (ICDs) that deliver electrical stimuli to tissue of a patient. ICDs typically comprise, inter alia, a control module, a capacitor, and a battery that are housed in a hermetically sealed container. When therapy is required by a patient, the control module signals the battery to charge the capacitor, which in turn discharges electrical stimuli to tissue of a patient.

The battery includes a case, a liner, and an electrode assembly. The liner surrounds the electrode assembly to prevent the electrode assembly from contacting the inside of the case. The electrode assembly comprises an anode and a cathode with a separator therebetween. In the case wall or cover is a fill port or tube that allows introduction of electrolyte into the case. The electrolyte is a medium that facilitates ionic transport and forms a conductive pathway between the anode and cathode. It is desirable to increase battery efficiency.

BRIEF DESCRIPTION OF THE DRAWINGS

The present invention will become more fully understood from the detailed description and the accompanying drawings, wherein.

DETAILED DESCRIPTION

Figure 1:
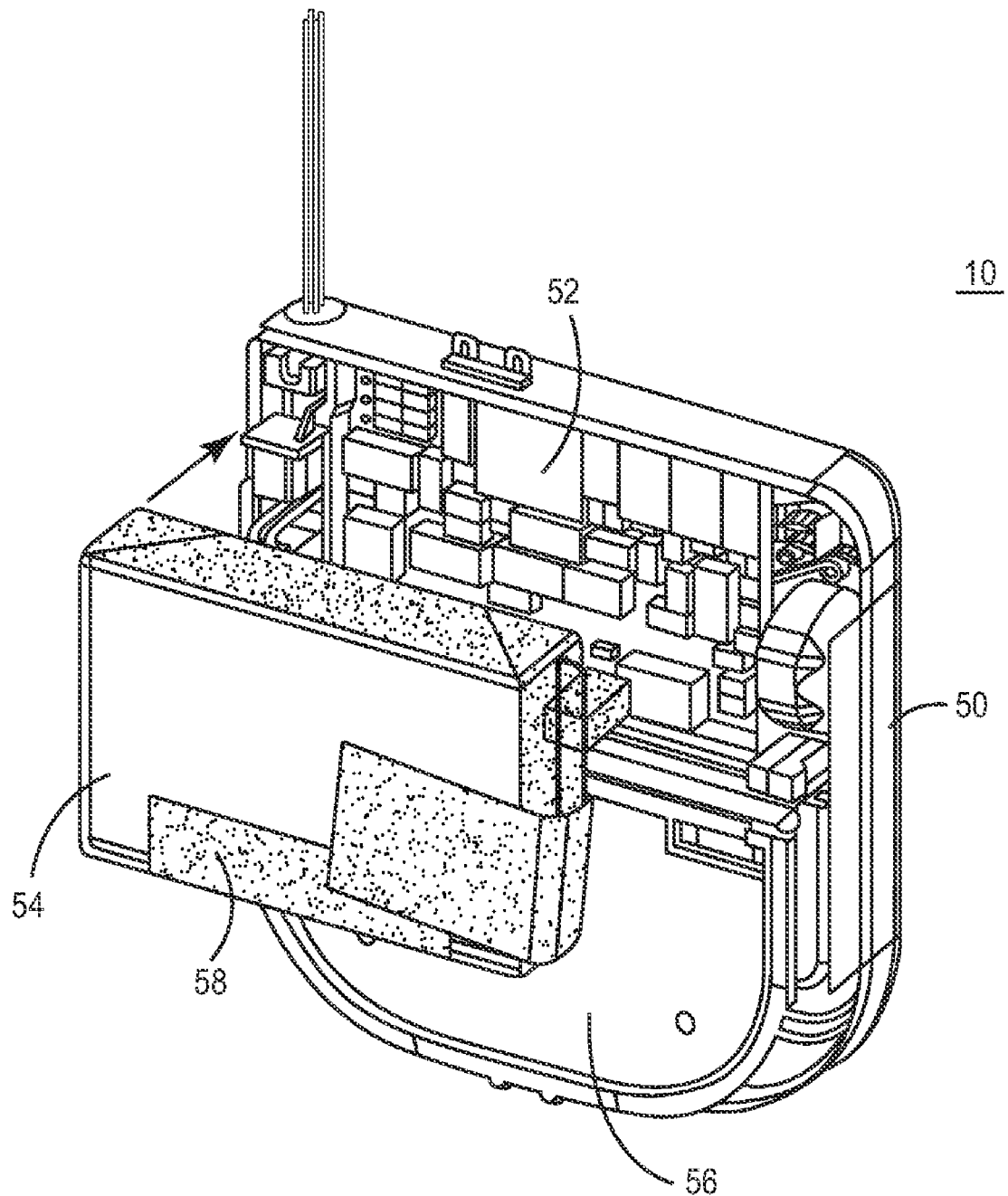
FIG. 1 is a cutaway perspective view of an implantable medical device (IMD)

The following description of embodiments is merely exemplary in nature and is in no way intended to limit the invention, its application, or uses. For purposes of clarity, the same reference numbers are used in the drawings to identify similar elements.

The present invention is directed to a battery cell for an implantable medical device (IMD). The battery cell includes an anode, a cathode, an insulator therebetween, and electrolyte. The cathode is comprised of silver vanadium oxide (SVO) and fluorinated carbon ($CF_x$). One embodiment of the claimed invention relates to fluorine that exists in an amount greater than or equal to 61 weight percent (%) of $CF_x$.

The battery cell of the claimed invention exhibits excellent chemical stability, and low and stable battery cell resistance during long term discharge. During long-term discharge, such batteries exhibit no capacity loss due to chemical reactions, and no increase in cell resistance. Battery cell capacity is typically associated with the ability of the battery cell to discharge current. Exemplary long term discharge is greater than or equal to three years during which batteries were continuously discharged at body temperature (37° C.). Additionally, a battery cell exhibits excellent thermal stability (e.g. no cell resistance increase) during "shelf life." Shelf life is the time in which an implantable medical device is produced and before it is implanted into a patient. Moreover, a battery cell exhibits slow swelling during discharge of capacity. The battery cell also has a high capacity per unit volume. Manufacturing costs are also reduced with the active cathode.

FIG. 1 depicts an IMD 10. Exemplary IMD 10 includes implantable pulse generators (IPGs), implantable cardioverter-defibrillators (ICDs), neurostimulators or other suitable devices. IMD 10 includes a case 50, a control module 52, a battery 54 (e.g. organic electrolyte battery) and capacitor(s) 56. Control module 52 controls one or more sensing and/or stimulation processes from IMD 10 via leads (not shown). Battery 54 includes an insulator 58 disposed therearound. Battery 54 charges capacitor(s) 56 and powers control module 52. Exemplary ways to construct battery 54 are described, for example, in commonly assigned U.S. Pat. No. 6,017,656 issued to Crespi et al. and entitled "ELECTROYLYTE FOR ELECTROCHEMICAL CELLS HAVING CATHODES CONTAINING SILVER VANADIUM OXIDE" and U.S. Patent Application US20060166078A1 filed Jan. 26, 2005, and entitled "IMPLANTABLE BATTERY HAVING THERMAL SHUTDOWN SEPARATOR", which are incorporated herein by reference, in relevant part.

Figures 2, 3:
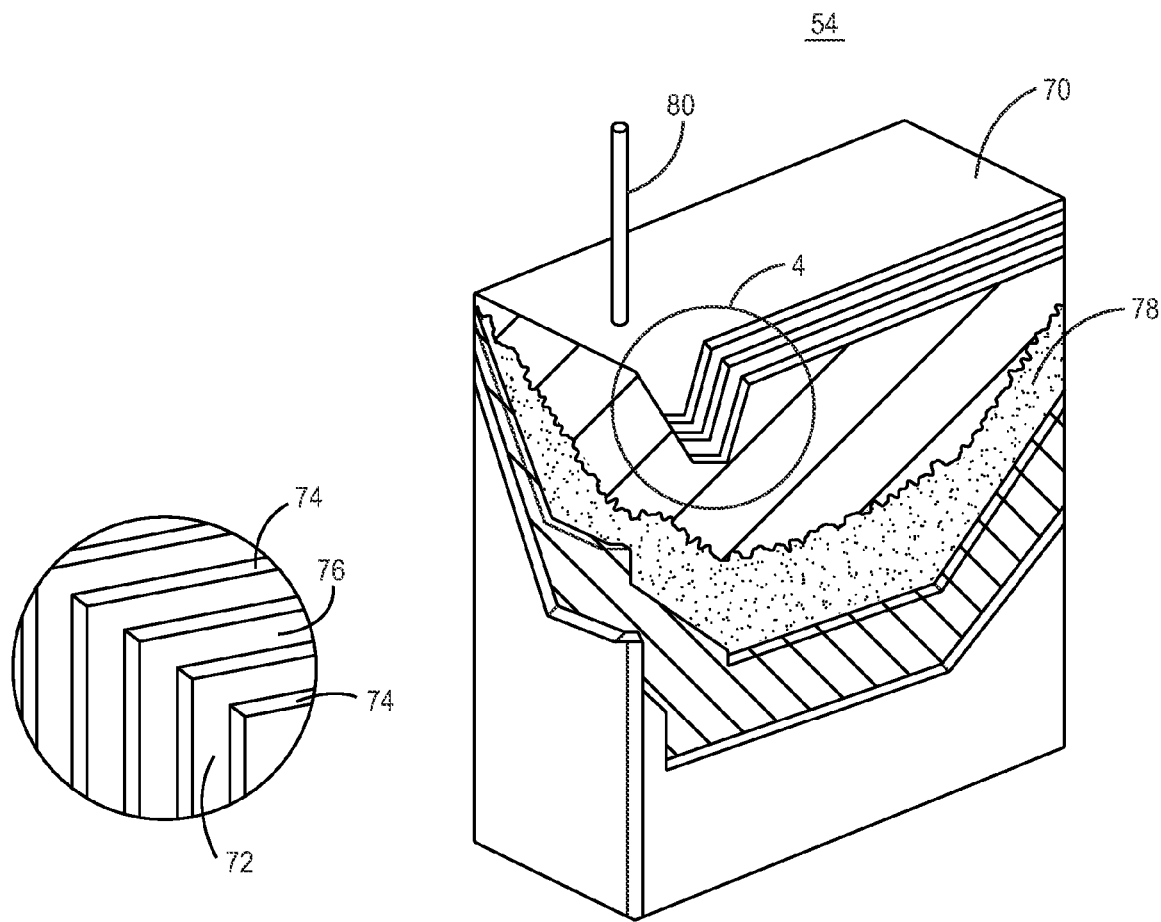
FIG. 2 is a cutaway perspective view of a battery in the IMD of FIG. 1.
FIG. 3 is an enlarged view of a portion of the battery depicted in FIG. 2 and designated by line 4.

FIGS. 2 and 3 depict details of an exemplary organic electrolyte battery 54. Battery 54 (also referred to as cell) includes a case 70, an anode 72, separators 74, a cathode 76, a liquid electrolyte 78, and a feed-through terminal 80. Cathode 76 is wound in a plurality of turns, with anode 72 interposed between the turns of the cathode winding. Separator 74 insulates anode 72 from cathode 76 windings. Case 70 contains the liquid electrolyte 78 to create a conductive path between anode 72 and cathode 76. Electrolyte 78 serves as a medium for migration of ions between anode 72 and cathode 76 during discharge of the cell.

Anode 72 is formed of a material selected from Group IA, IIA or IIIB of the periodic table of elements (e.g. lithium, sodium, potassium, etc.), alloys thereof or intermetallic compounds (e.g. Li—Si, Li—B, Li—Si—B etc.). Anode 72 may also comprise an alkali metal (e.g. lithium, etc.) in metallic or ionic form.

Cathode 76 comprises metal oxides (e.g. silver vanadium oxide (SVO) and $CF_x$. Generally, production of $CF_x$ (e.g. carbon monofluoride ($CF_{1.1}$) etc.) involves an exemplary chemical reaction such that:

$$F_2+(x+y+z)C \rightarrow xCF_{1.1}+yC+z(CF_{n \geq 2})$$

where x, y, and z are numerical values that may be positive integers or positive rational numbers. In this reaction, fluorine and carbon react to form $CF_{1.1}$. Unreacted carbon and impurities are by-products of the chemical reaction, which must be minimized during production of $CF_x$. It is desirable to achieve a weight percentage of fluorine greater than or equal to 61% in $CF_x$ while reducing impurities. Preferably, greater than or equal to 63% or 65% of fluorine exists in the $CF_x$. Numerous other embodiments are directed to different weight percentages of fluorine found in $CF_x$. Table 1, presented below, lists various embodiments of the invention. Table 1 is interpreted such that the first embodiment relates to fluorine that has 61 weight percentage (%) in the $CF_x$; a second embodiment that has fluorine at 62% in the $CF_x$, and so on. The third column of Table 1 provides exemplary ranges of weight percentages of fluorine found in $CF_x$. For example, in the first embodiment, fluorine may be found in the range of 61% or greater in the $CF_x$; in the second embodiment, fluorine may be found in the range of 62% or greater in the $CF_x$ and so on. It is deemed desirable to attain high fluorine weight percentage as this helps in reducing unreacted carbon (preferably, the $CF_x$ exhibits less than 5% of free carbon) and other impurities in the sample.

The percentage of fluorine in $CF_x$ is determined by a method referred to as the alkali fusion method along with fluoride ion selective electrode analysis.

TABLE 1

Individual embodiments related to weight percentage of fluorine in $CF_x$

| Embodiment | % of fluorine found in $CF_x$ | Range of % of fluorine found in $CF_x$ |
|---|---|---|
| 1 | 61 | ≧61 |
| 2 | 62 | ≧62 |
| 3 | 63 | ≧63 |
| 4 | 64 | ≧64 |
| 5 | 65 | ≧65 |
| 6 | 66 | ≧66 |
| 7 | 67 | ≧67 |
| 8 | 68 | ≧68 |
| 9 | 69 | ≧69 |
| 10 | 70 | ≧70 |
| 11 | 71 | ≧71 |
| 12 | 72 | ≧72 |
| 13 | 73 | ≧73 |
| 14 | 74 | ≧74 |
| 15 | 75 | ≧75 |
| 16 | 76 | ≧76 |
| 17 | 77 | ≧77 |
| 18 | 78 | ≧78 |
| 19 | 79 | ≧79 |
| 20 | 80 | ≧80 |

A carbon precursor (also referred to as "starting carbon") affects the composition, purity, and crystal structure of the $CF_x$, which, in turn, determines whether a high weight percentage of fluorine in $CF_x$ is achieved. Carbon precursor is a component from which fluorinated carbon is formed through a fluorination process. Carbon precursor is fibrous carbon (e.g. polyacrylonitrile (PAN), rayon source etc.) and/or non-fibrous carbon that is preferably non-graphitic. Graphitic is defined as crystalline form of carbon with a long-range laminar atomic structure. Non-graphitic is defined as forms of carbon that are poorly crystalline and do not possess long-range laminar atomic structure. Such a carbon structure can be defined by a full width at half maximum ($FWHM_{002}$) of a 002 peak in the XRD pattern of the carbon ≧ 1° Cu Kα 2θ.

Purity and crystallinity of the carbon precursor substantially affect the percentage by weight of fluorine in $CF_x$. In terms of purity, it is desirable that carbon content be greater than 95% by weight in the carbon precursor, determined by a combustion technique. More preferably, the carbon content of the carbon precursor sample is greater than 99%, and the precursor has less than or equal to 1% of elemental impurities. In addition to purity, low crystallinity in the carbon precursor is desirable since it allows the carbon precursor to be fully fluorinated at lower temperatures (e.g. less than 400 Celsius (° C.)). PAN or rayon based carbon fibers that possess high purity and low crystallinity, can be homogeneously fluorinated to yield a desired fibrous $CF_x$ product. In addition, high purity fibrous carbons with high crystallinity may also be fully fluorinated at high temperatures (e.g. temperatures greater than 400° C. etc.) and may yield desirable properties. Non-fibrous carbon samples, with high purity and low crystallinity, can be fully fluorinated to yield a desired product with homogeneous fluorination. Similarly, it is likely that non-fibrous carbon with high purity and high crystallinity can be fully fluorinated at high temperatures (>400° C.) and may yield desirable properties.

Figure 4:
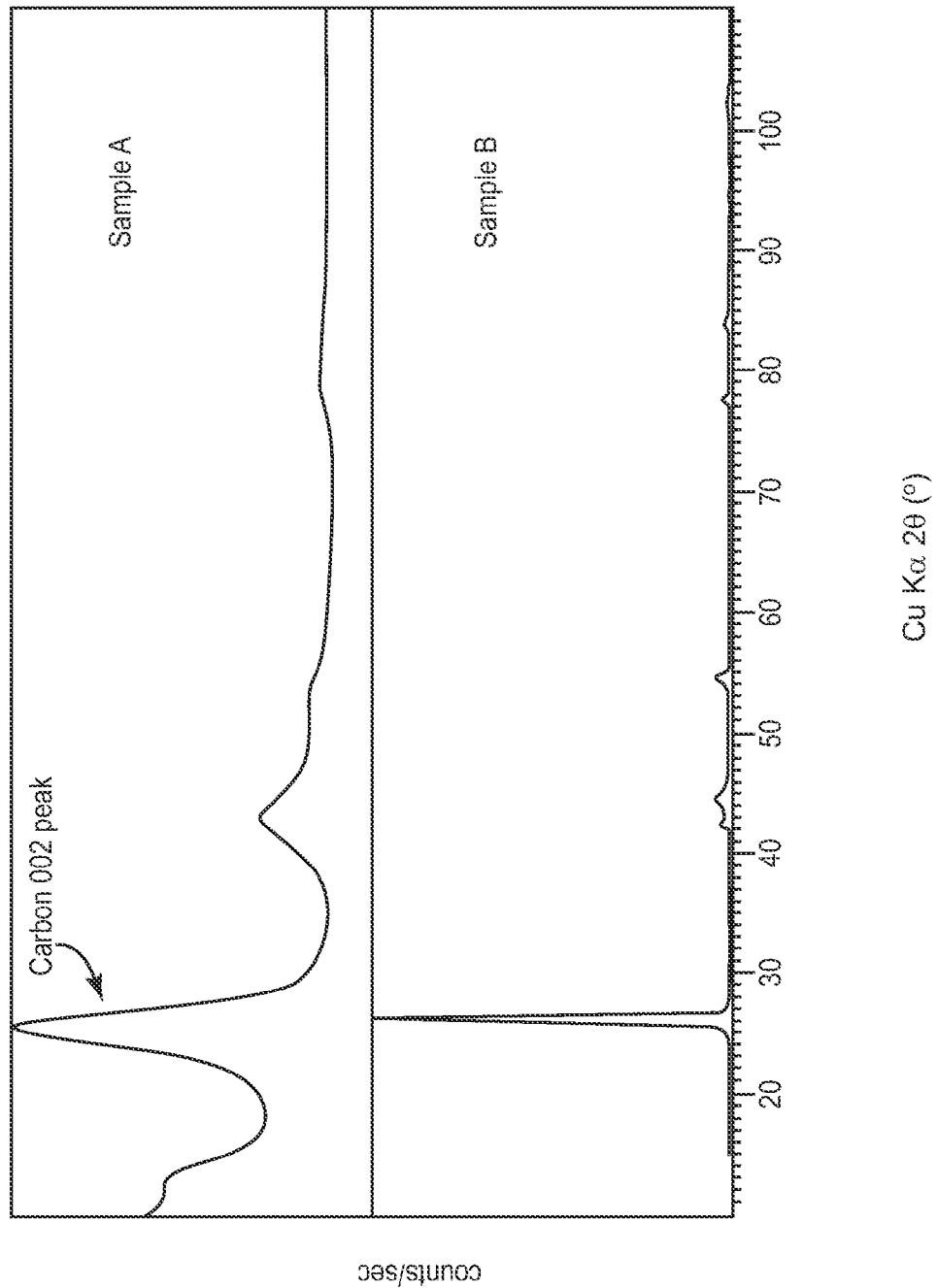
FIG. 4 is a X-ray diffraction (XRD) spectrum that graphically compares desired and undesired crystallinity characteristics of carbon precursor samples.

In order to understand the manner in which crystallinity may be determined, an exemplary X-ray diffraction (XRD) spectrum is presented in FIG. 4 of carbon precursor samples. In particular, the width of the carbon 002 peak determines crystallinity characteristic associated with each sample. Sample A is substantially less crystalline than Sample B. Sample A has a $FWHM_{002} > 1°$ Cu Kα 2θ and can yield a homogeneously fluorinated product. More preferably, the carbon precursor has the $FWHM_{002} > 3°$ Cu Kα 2θ. In contrast, Sample B is less desirable since it has a $FWHM_{002} \leq 1°$ Cu Kα 2θ. Sample B is also less desirable since it cannot be as homogeneously fluorinated at low temperatures (<400° C.) as Sample A.

Figure 5:
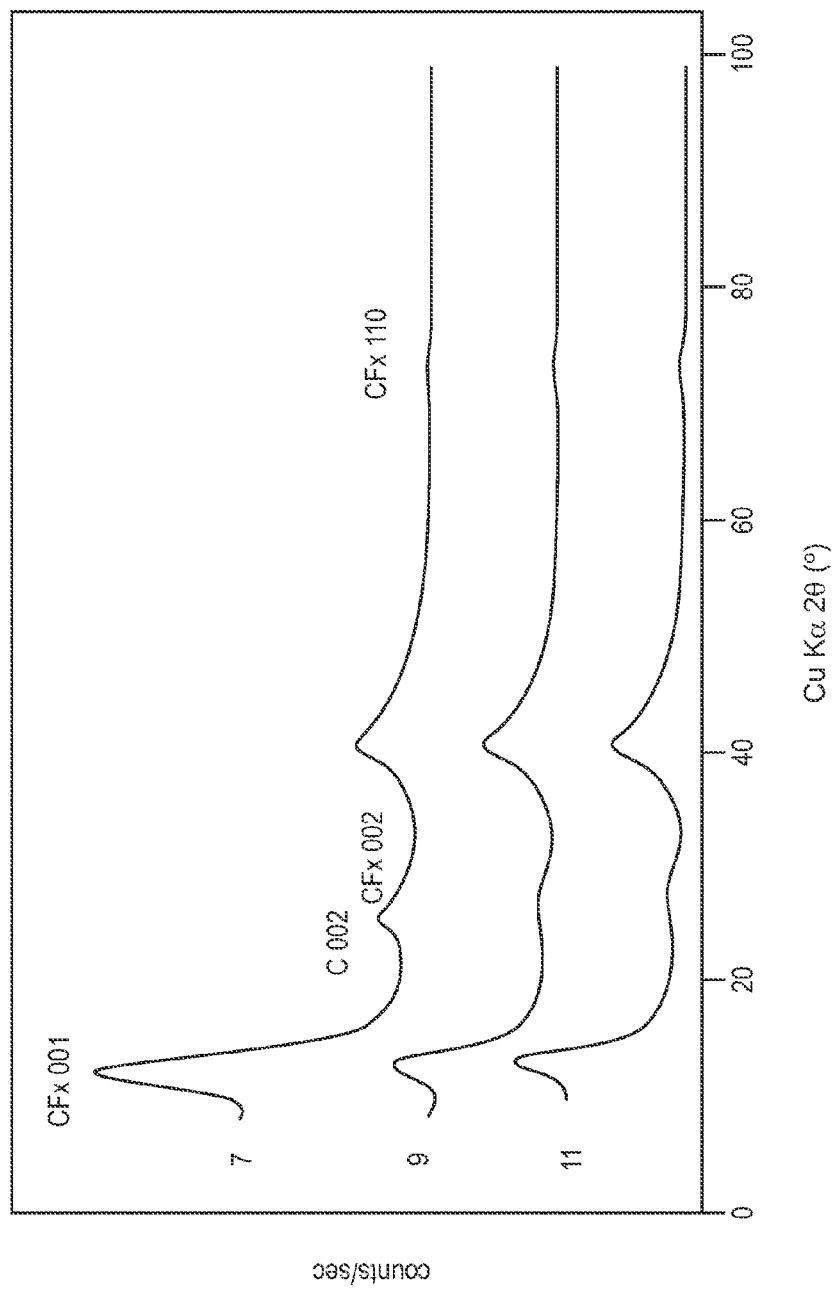
FIG. 5 is a XRD spectrum that graphically compares desired and undesired crystallinity characteristics of fluorinated carbon ($CF_x$) samples.
Figure 6:
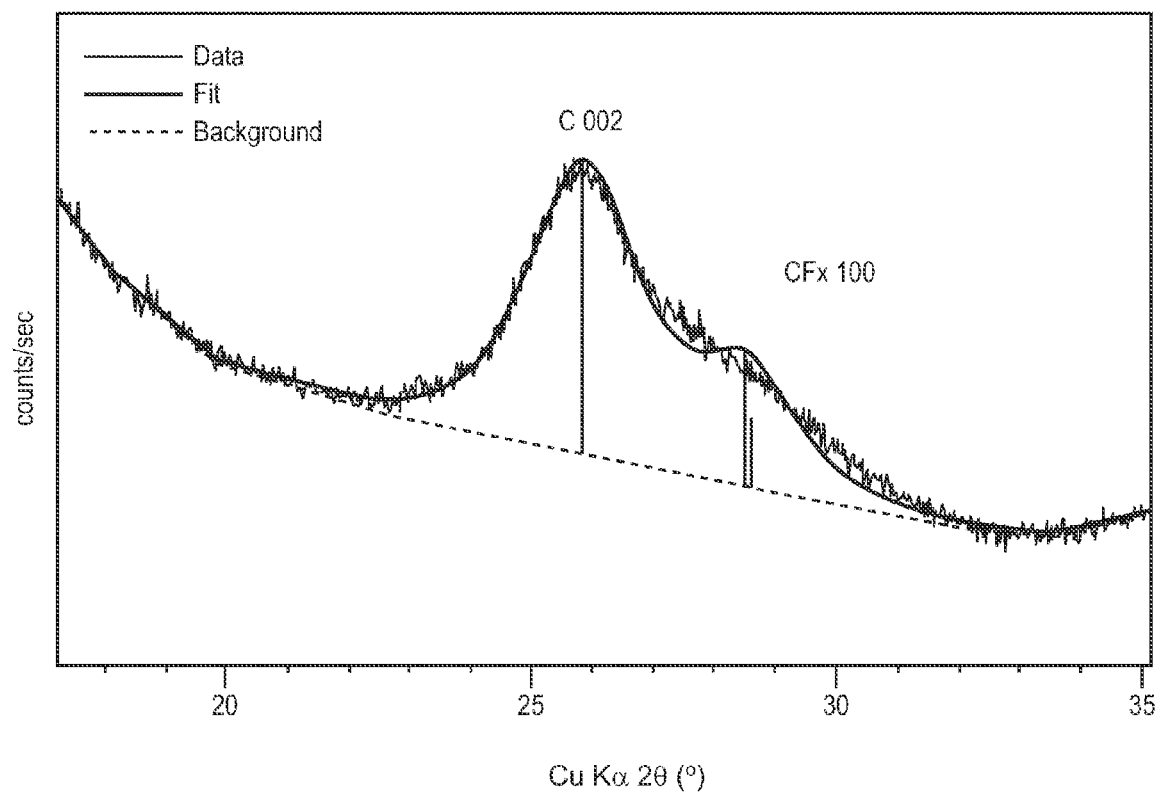
FIG. 6 is a XRD spectrum that graphically depicts peaks of an undesired $CF_x$ sample that includes too high an amount of unreacted remnant carbon.
Figure 7:
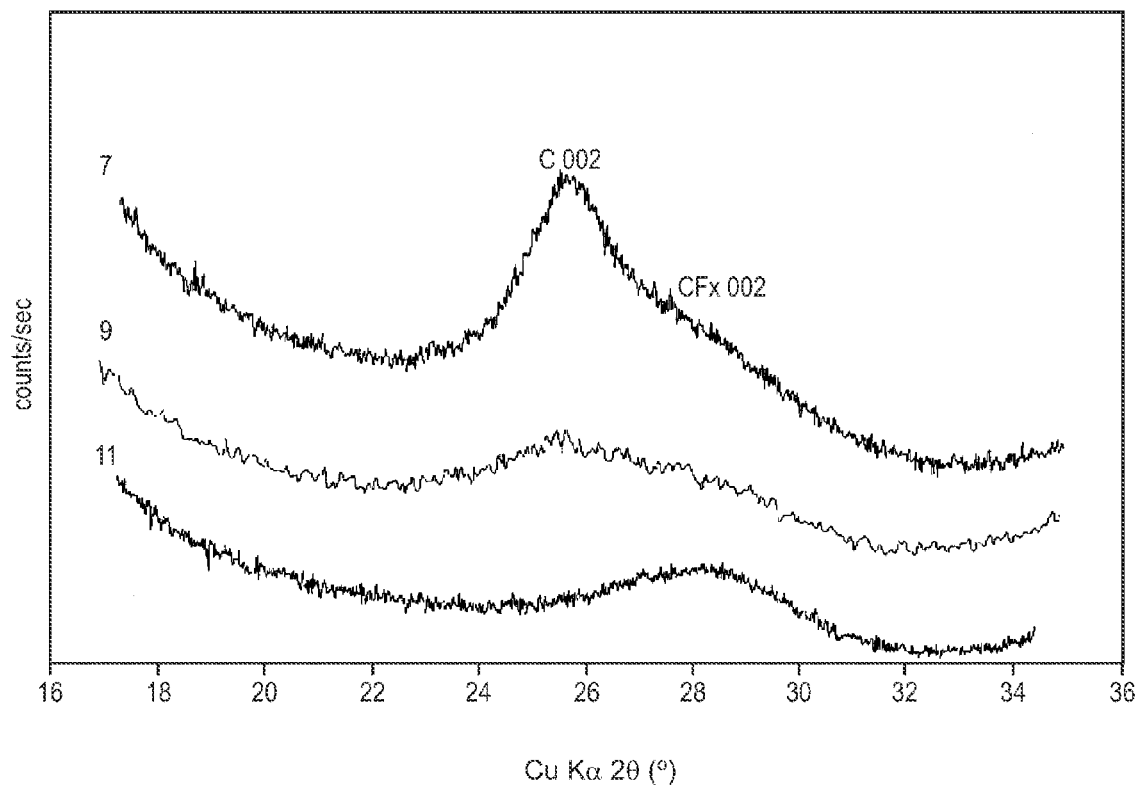
FIG. 7 is an enlarged view of a two peak structure depicted in FIG. 5.

While selection of a carbon precursor may affect the amount of fluorine found in the $CF_x$, characteristics of the $CF_x$ determine the actual amount of fluorine found in the $CF_x$ and the electrochemical performance of the $CF_x$. XRD is used to determine chemical structure and the carbon impurity of the $CF_x$, as shown in FIGS. 5-7. $CF_x$ peaks 001 and 110 determine the purity and the crystallinity of the $CF_x$ whereas the carbon peak 002 determines unreacted carbon that remains in the $CF_x$. The area under the $CF_x$ 001 peak, the main peak of fluorinated peaks, is used to normalize the area of other peaks. Table 2 summarizes peak identifiers and the manner in which each peak is used in XRD interpretation.

TABLE 2

Details of peaks typically observed for the fluorinated carbon samples

| Peak Identifier | Position (Cu Kα 2θ) | Comments |
|---|---|---|
| $CF_x$ 001 | 12-14° | $CF_x$ is main peak. The other peaks in the spectra are normalized to this |

TABLE 2-continued

Details of peaks typically observed for the fluorinated carbon samples

| Peak Identifier | Position (Cu Kα 2θ) | Comments |
|---|---|---|
| | | peak. |
| Carbon 002 | 25-27° | The primary peak for carbon, which shows up in $CF_x$ sample containing remnant un-reacted carbon. |
| $CF_x$ 002 | 27-29° | This peak overlaps in part with the (C 002) peak. $CF_x$ 002 is deconvoluted to determine $CF_x$ 002 and C002 individual peak contributions. |
| $CF_x$ 110 | 72-76° | This peak is typically found in crystalline samples of $CF_x$ but the intensity of the peak may be different. |

The electrochemical performance of the $CF_x$ depends on the position of the $CF_x$ 001 peak. Samples with peak positions between $12.7° \leq 2\theta_{001} \leq 13.7°$ are believed to possess a dominant fraction of the stoichiometric fluorinated carbon phase, $CF_{1.1}$, and therefore yield superior electrochemical performance. $CF_x$ with positions outside of this range, particularly $12.7° < 2\theta_{001}$, may be non-stoichiometric and yield poorer electrochemical performance.

The desired compositional homogeneity and phase-purity of the $CF_x$ depends, in part, upon the crystallinity of $CF_x$. The desired crystallinity of the $CF_x$ may be defined as the area for the CFx 110 peak relative to the area for CFx 001 peak $\geq 2\%$ in the XRD pattern. It was further determined that for values of the (CFx 110 peak/CFx 001) area ratios $\geq 2.0\%$, lower cell resistance and improved performance is observed.

One type of impurity relates to organic impurities that may intercalate or chemisorb on intercalation compounds. Since free carbon serves as a host for impurities, it is desirable to reduce free carbon in the $CF_x$. Free carbon is elemental carbon present in an uncombined state. The carbon in the material may act as an intercalation host for organic impurities (e.g. $CF_2$, $CF_3$, etc.), which may adversely affect the electrochemical performance of the $CF_x$. Therefore, a lower remnant carbon is highly desirable. Presence of free carbon in a sample is shown by the carbon 002 peak in the XRD pattern (FIG. 5). The fraction of un-reacted carbon remaining in the $CF_x$ can be determined by the area under the carbon 002 peak relative to the area under the $CF_x$ 001 peak. The $CF_x$ 100 peak (at ca. at 27-29° CuKα2θ) is very close in position to the carbon 002 peak (at ca. 25-27° CuKα2θ). The contributions from these two partly overlapping peaks is de-convoluted to help determine the area under the carbon 002, as shown in FIG. 6. FIG. 7 shows a smaller range of data for the three samples in FIG. 5, with different relative areas under the carbon 002 peak. Table 5, presented below, lists samples with varying amounts of un-reacted carbon. The desired area ratio for the carbon 002 peak relative to the $CF_x$ 001 peak is $\leq 9\%$. Preferably, this ratio is $\leq 5\%$. More preferably, this ratio is $\leq 0.5\%$.

While XRD spectra are generally considered a reliable technique for determining purity and crystallinity in a sample, XRD spectra are unable to detect un-reacted carbon present in a sample that is not very crystalline and/or is highly dispersed. In such a case, presence of carbon can be detected by x-ray photoelectron spectroscopy (XPS). In this technique, monochromatic x-rays from an aluminum anode are incident on the sample and the energy of the emergent electrons is measured. The energy difference between the x-ray energy and the energy of the electron is indicative of the binding energy of the electrons in the material. Different bonds of carbon in the $CF_x$ compound have different electron binding energies. In particular, the C—C bonding from un-reacted carbon is substantially different than the C—F bonding of the $CF_x$. The high resolution carbon XPS spectra thus shows different peaks corresponding to the different bonds that carbon forms in the $CF_x$ compound and their relative fraction. The electrons can escape only from the top few atomic layers of the material and thus the information obtained pertains to the particle surface chemistry.

Low amounts of un-reacted carbon also exist in the $CF_x$ when, for example, an area percentage of less than 3.5% exists for the peak pertaining to the C—C bonding relative to all carbon 1s peaks in the high resolution XPS. Preferably, C—C bonding contribution is about <1%, which establishes that low amounts of unreacted carbon exists in the $CF_x$. More preferably, C—C bonding contribution is about <0.5%, which clearly shows that low amounts of unreacted carbon exist in $CF_x$.

Figure 8:
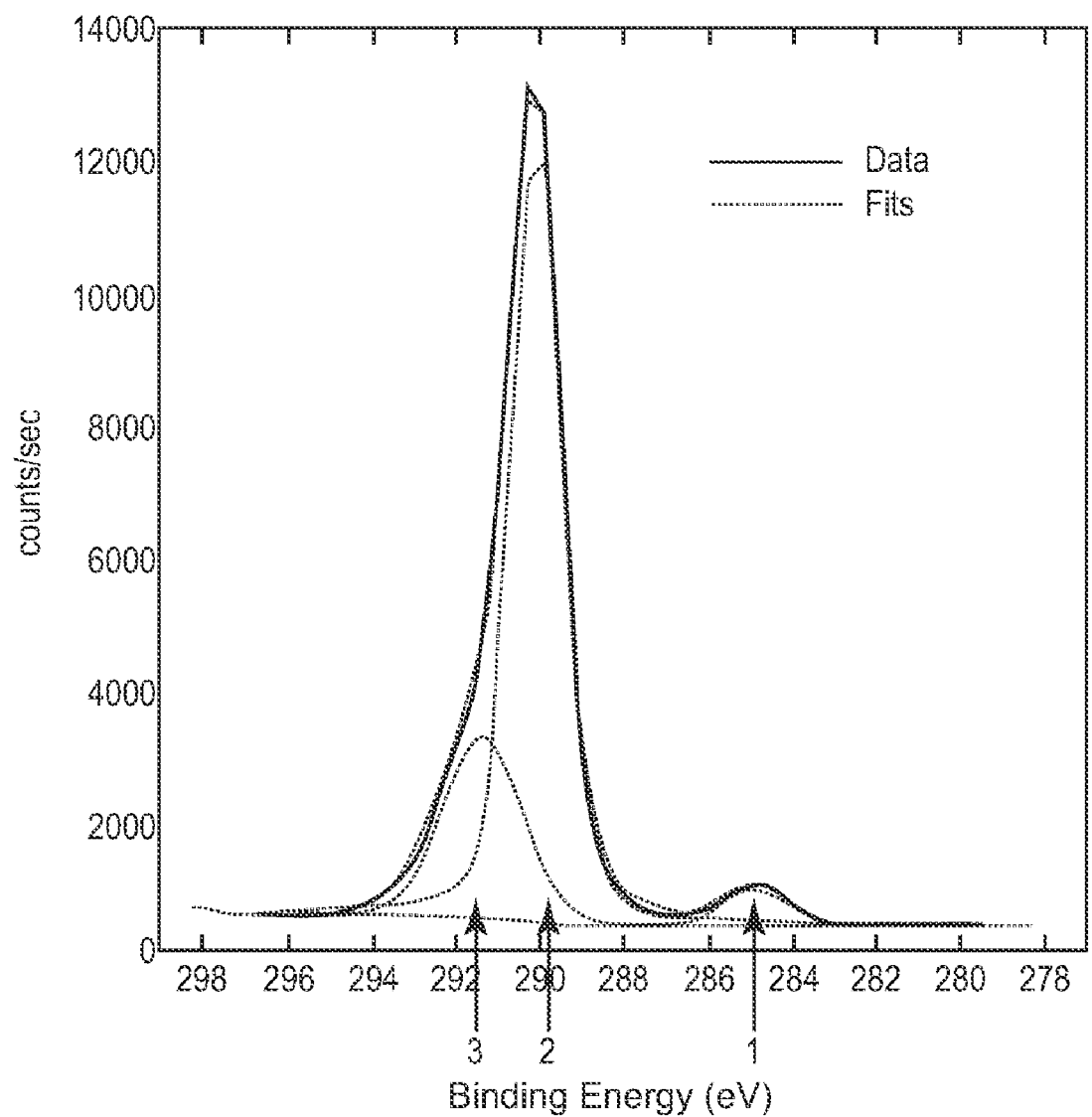
FIG. 8 is a X-ray photoelectron spectrum that graphically depicts different peak positions for carbon-carbon (C—C), carbon-fluorine (C—F), and C—$F_n$ ($n \geq 2$) peaks.

FIG. 8 shows a typical high resolution XPS spectra obtained from a $CF_x$ material. The different carbon 1s peaks marked in this spectrum pertain to: (1) C—C bonding, from the portion of $CF_x$ that is not fully fluorinated (2) C—F bonding from the stoichiometric carbon fluoride $CF_{1.1}$ and (3) $CF_{(n \geq 2)}$ from the super-stoichiometric carbon fluoride. The relative fractions of these carbon bonds on the surface of the material are obtained by fitting three individual peaks to this spectrum and taking the areas of those peaks relative to the total area under all peaks. The strongest peak in these spectra is centered at 290.1 eV and belongs to the C—F bonding from the stoichiometric $CF_{1.1}$. The C—C peak is centered ca. 5 eV below the main peak, i.e. at 285 eV. As observed with the XRD data, with decreasing amounts of remnant carbon, the electrochemical performance of the $CF_x$ is improved. It is desirable to have the area under the C—C peak relative to the C—F peak to be $\leq 3.5\%$. Preferably, this ratio is $\leq 1\%$. More preferably, this ratio is $\leq 0.5\%$.

EXAMPLES

The claimed invention has been established as electrochemically superior to conventional cathodes. Crystallinity data was obtained for six samples of $CF_x$, as presented below in Table 3.

TABLE 3

$CF_x$ 001 and $CF_x$ 110 Peak Characteristics

| | | XRD | |
|---|---|---|---|
| Sample Identifier | Carbon Source/ Morphology | $2\theta_{001}$ | Area ratio % of 110/001 peaks |
| 1 | Non-fibrous | 12.58 | 1.47% |
| 2 | Non-fibrous | 12.60 | 1.62% |
| 3 | Fibrous | 12.48 | 1.40% |
| 4 | Fibrous | 13.06 | 4.52% |
| 5 | Fibrous | 13.42 | 5.90% |
| 6 | Fibrous | 13.59 | 17.80% |

Figure 9:
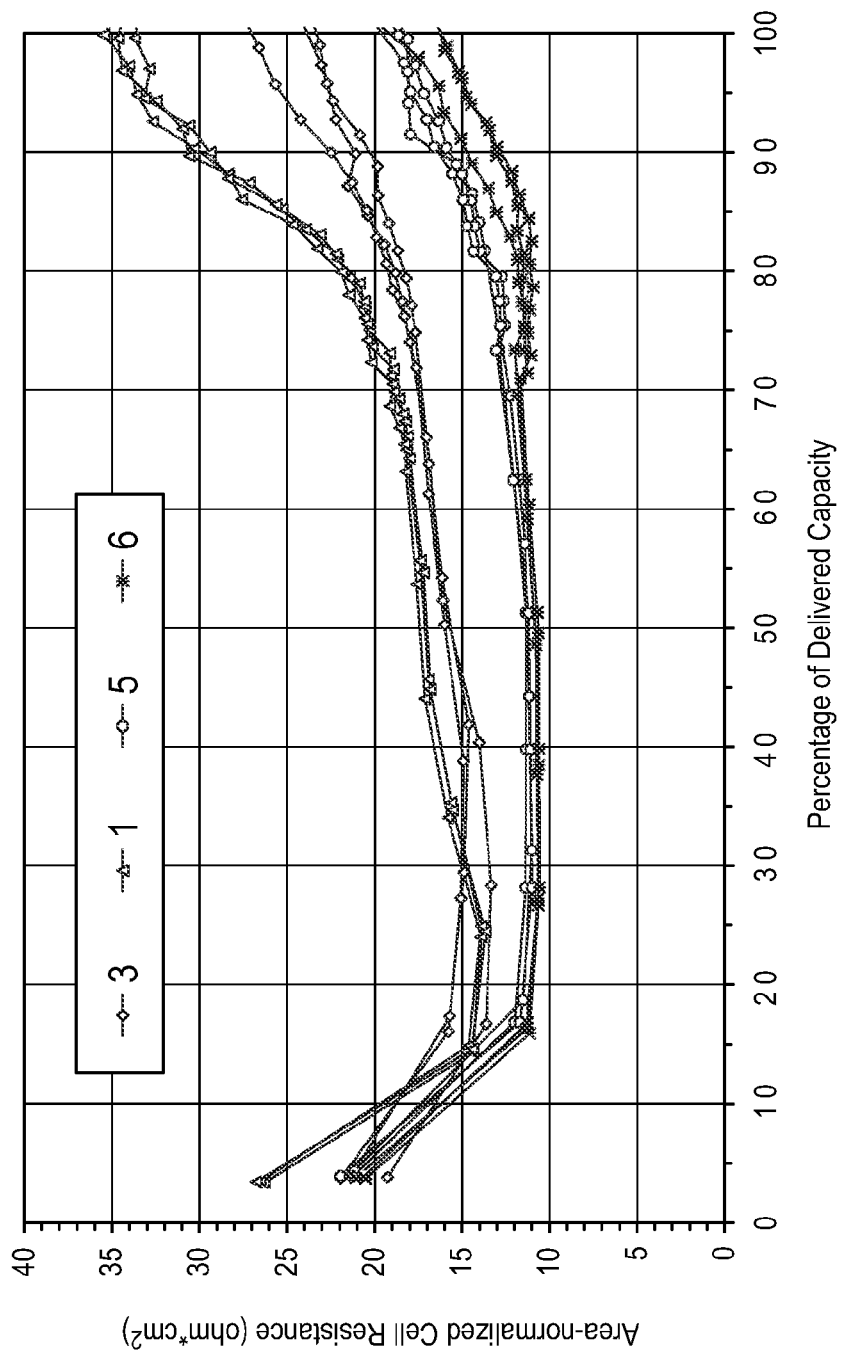
FIG. 9 graphically compares battery cell resistance throughout discharge for battery cells with exemplary $CF_x$ materials.

As noted, samples 1, 2 and 3 show the $CF_x$ 001 peak in the XRD spectrum centered at less than 12.7° Cu Kα 2θ, whereas samples 4, 5, and 6 show the peak to be centered at greater than 12.7° Cu Kα2θ. Additionally, the area ratios of $CF_x$ 110/001 peaks for samples 1, 2 and 3 is <2%, whereas samples 4, 5 and 6 show the area ratios of the $CF_x$ 110/001 peaks to be $\geq 2\%$. Samples 4-6 are clearly electrochemically superior to samples 1-3, as shown in FIG. 9. Cells with $CF_x$ samples of 1 and 3 have higher cell resistance throughout discharge than cells with $CF_x$ samples of 5 and 6. Lower cell resistance is desirable for implantable applications since therapy can be delivered faster with cells having low cell resistance. $CF_x$ 001 peak in the XRD spectrum centered at >12.7° Cu Kα2θ is therefore desirable. Also, this data shows the area ratios of the $CF_x$ 110/001 peaks ≧2% are desirable.

$CF_x$ samples with less unreacted carbon are electrochemically superior to samples with a higher amount of unreacted carbon. Table 4 presents the unreacted carbon data associated $CF_x$ samples.

TABLE 4

Carbon 002 peak ratio XRD

| Sample Identifier | Carbon Source/Morphology | XRD C002 peak area relative to $CF_x$001 peak area |
|---|---|---|
| 7 | Non-Fibrous | 10.50% |
| 8 | Non-Fibrous | 10.00% |
| 9 | Fibrous | 9.00% |
| 10 | Fibrous | 0.00% |
| 11 | Fibrous | 0.00% |
| 12 | Fibrous | 0.00% |

Figure 10:
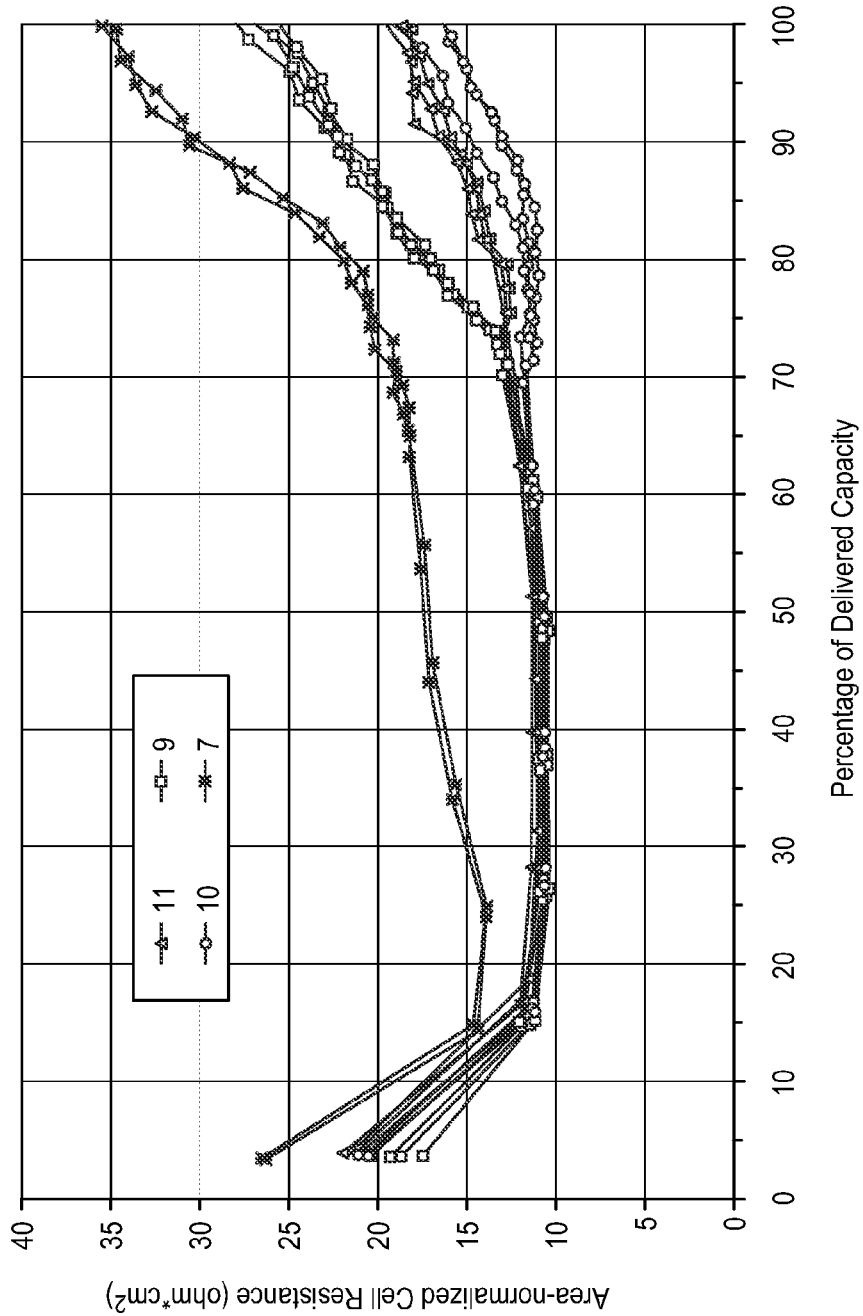
FIG. 10 graphically compares cell resistance throughout discharge for battery cells with exemplary $CF_x$ materials.

In another embodiment, samples 7, 8 and 9 of Table 4 show the carbon 002 peak area relative to the $CF_x$ 001 peak in the XRD pattern of the $CF_x$ to be greater than 9%. In contrast, samples 10, 11 and 12 possess a lower carbon content and for these samples the 002 peak are relative to the $CF_x$ 001 peak area in the XRD pattern of the $CF_x$ is ≦9%. The latter group of samples is electrochemically superior to the former, as shown in FIG. 10. The battery cell with $CF_x$ sample 7 has higher cell resistance throughout discharge than cells with other $CF_x$ samples, while cell with $CF_x$ sample 9 has higher cell resistance after about 70% discharge than cells with $CF_x$ samples 10 and 11. This indicates that samples with less than or equal to 9% carbon 002 peak area are desirable. There is a continual improvement in electrochemical performance seen with decreasing carbon content. Therefore, it is preferable to have the peak ratio less than or equal to 5%. The XRD spectra for samples 7, 9 and 11 from this example are shown in FIGS. 5 and 7.

In still yet another embodiment, samples 13-15 of Table 5 show the C—C bonding % in the XPS data to be >3.5%, whereas samples 16-20 show the C—C bonding contribution to be ≦3.5%. The latter group of samples is electrochemically superior to the former samples.

TABLE 5

C—C peak contribution in XPS data

| Sample Identifier | Carbon Source/Morphology | XPS C—C peak area % |
|---|---|---|
| 13 | Non-Fibrous | 3.50% |
| 14 | Non-Fibrous | 3.50% |
| 15 | Fibrous | 4.50% |
| 16 | Fibrous | 0.70% |
| 17 | Fibrous | 0.10% |
| 18 | Fibrous | 0.50% |
| 19 | Fibrous | 0.50% |
| 20 | Fibrous | 0.00% |

Figure 11:
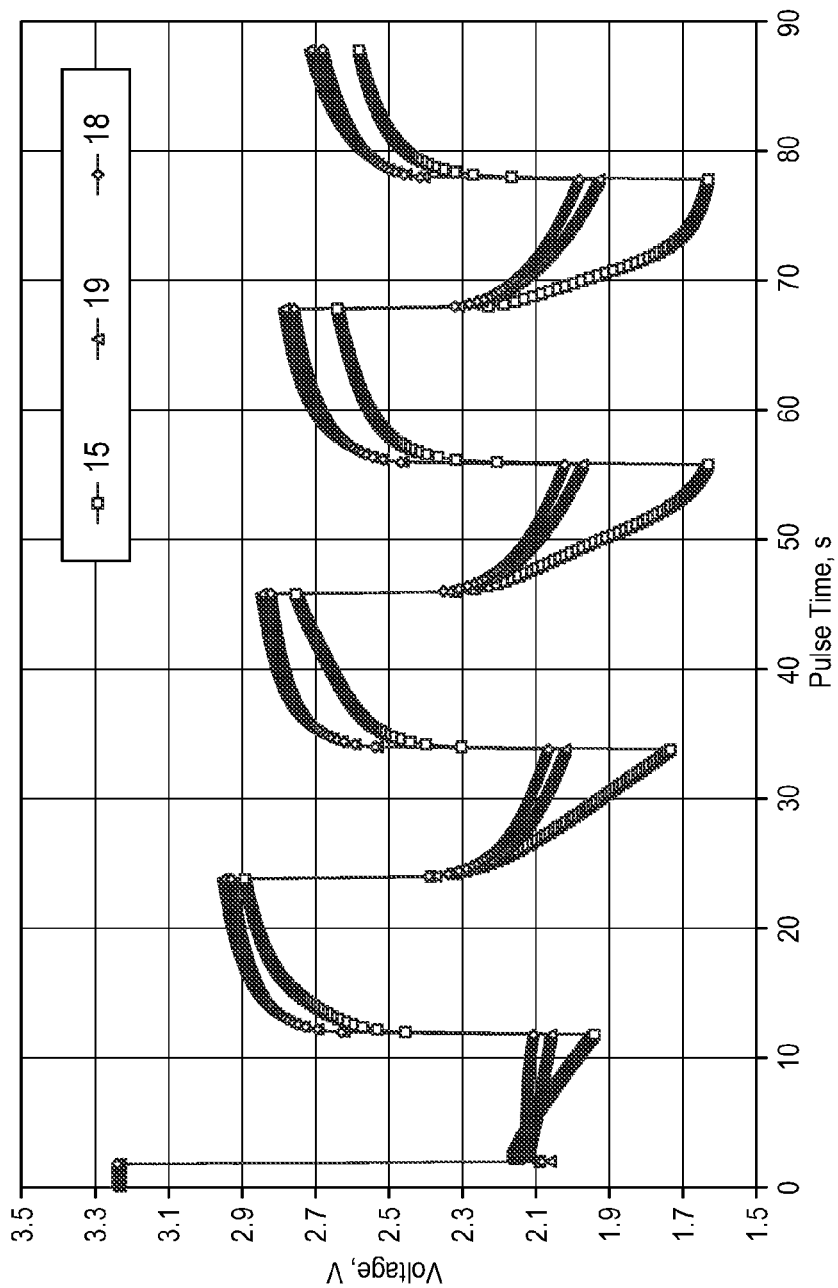
FIG. 11 graphically compares cell voltage during high current discharge (30 mA/cm2) discharge for battery cells with other exemplary $CF_x$ materials.

FIG. 11 graphically compares the electrochemical performance of battery cells with $CF_x$ samples 15, 18 and 19. Battery cells with $CF_x$ sample 15 have lower cell voltage during high current drain (about 30 mA/cm²) than cells with $CF_x$ samples 18 and 19. Higher cell voltage during high current drain is desirable for implantable applications. Indeed, continual improvement in electrochemical performance was observed with decreasing carbon content. It is therefore preferred to have C—C bonding contribution less than 1%.

In Table 6, weight percentage fluorine of $CF_x$ samples is listed. Among these samples, 24-30 show lower and more stable cell resistance throughout discharge of the battery, as compared to samples 21-23. Further, samples 22-23 show improved performance than sample 21. This trend highlights that increasing fluorine weight percentage in the sample is desirable. Reduction in unreacted carbon and other impurities may be the cause for this improvement performance with increasing fluorine weight percentage in the sample.

TABLE 6

Fluorine Weight Percentage of Some Exemplary $CF_x$ Materials

| Sample Identifier | F % by Weight |
|---|---|
| 21 | 57.5 |
| 22 | 61 |
| 23 | 61.6 |
| 24 | 63 |
| 25 | 63.3 |
| 26 | 63.3 |
| 27 | 64.4 |
| 28 | 65.1 |
| 29 | 65.4 |
| 30 | 67.05 |

In another embodiment, battery cell resistance is decreased by decreasing transition metals (e.g. Fe, Ni, Cu etc.). For example, it is desirable to reduce transition metals to an amount less than 500 parts per million (ppm) in the $CF_x$. For example, this may be accomplished by purification of the carbon precursor materials.

In another embodiment, $CF_x$ is coated with an oxide such as $Al_2O_3$, $TiO_2$ and $ZrO_2$ that tends to restrain swelling and absorb impurities. In this embodiment, one of the oxide compounds such as $Al_2O_3$, $TiO_2$ and $ZrO_2$ are coated onto with the $CF_x$.

Intercalation compounds (e.g. $C_xVF_6$ etc.) enhance performance and displace undesirable species. For example in U.S. Pat. Nos. 5,175,066 and 5,017,444 discuss $C_xVF_6$ and other intercalation compounds that are electrochemically reversible and also enhance the conductivity of the carbon. The reversibility and high conductivity may result in an improved cathode. The rate capability may be particularly enhanced if the layer of the intercalation compound is along the side of the electrode facing the anode.

Reactive impurities (e.g. "free oxidizers") are removed and the intercalated or sorbed hydrofluoric acid (HF) is neutralized. Surfactants (e.g. TRITON X100 commercially available from Triton etc.) may be added to alcoholic alkali metal hydroxide and soaking the $CF_x$ at temperatures above room temperature (e.g. 25° C.) followed by thorough washing and drying. Drying may occur, for example, at 125° C. or other suitable temperatures.

Figure 12:
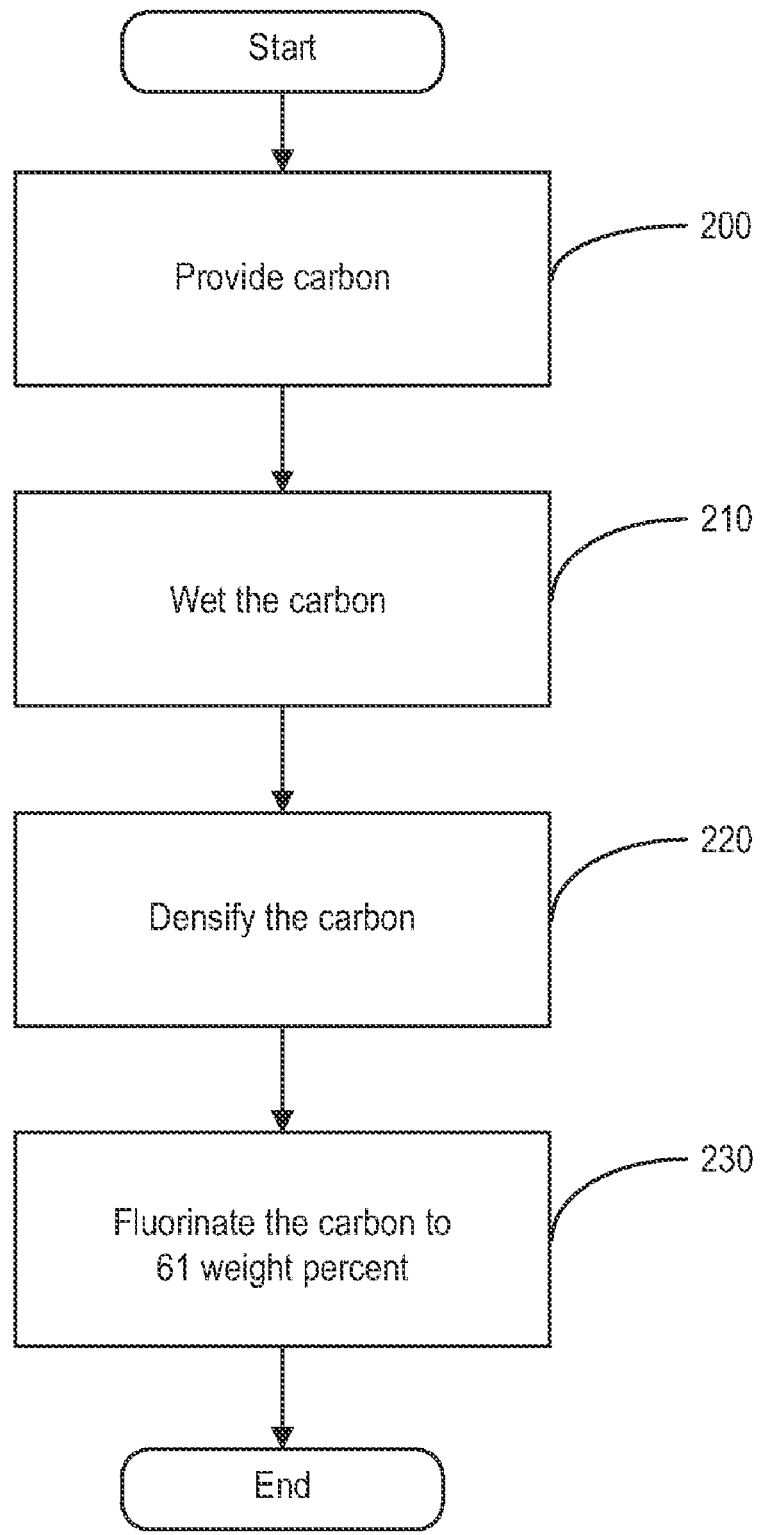
FIG. 12 is a flow diagram for fluorinating carbon and describes a process in which carbon is fluorinated with reduced impurities.

One problem that is experienced in fluorinating carbons with low bulk density is the low mass of carbon that can be processed in a batch. FIG. 12 depicts a method that addresses fluorinating carbon precursors with low bulk density. At block 200, a mass of carbon is provided. At block 210, the carbon is wetted with a temporary binder or a carbonizeable binder. Preferably, the carbon is wetted with a temporary or carbonizeable binder such as poly vinyl alcohol. The resulting carbon is denser when dried. The carbon product can be dried by, for example, thorough heating, increased air flow, vacuum drying or other like methods. To attain increased densified carbon reactant starting material, the carbon can be further densified or pelletized.

At block 220, a volume of the carbon is reduced. The volume of carbon may be reduced, for example, through drying, compressing, palletizing and other suitable methods. In one embodiment, densification occurs by compressing using a die with a hydraulic press or a rolling mill.

Addition of silver to the carbon in the form of a soluble salt (e.g. silver nitrate etc.) enhances the fluorination process. Silver may act as a catalyst of an active intermediate such as $AgF_2$ that may result in the formation of $CF_x$ at a lower temperature (less than or equal to 400° C.) and/or shorter time (e.g. less than 7 hours). Additionally, silver on the surface of the $CF_x$ may enhance conductivity of the cathode. The addition of silver "catalyst" may also assist in achieving complete fluorination of the carbon. This process minimizes unreacted carbon at a lower temperature and avoids exfoliation of the carbon-like structure. Carbon-like structure is similar to the morphology of the carbon precursor reactant.

Additionally, Brunauer, Emmett and Teller (BET) surface area of carbon precursor may affect ease of fluorination of the carbon precursor material. A higher surface area of a carbon precursor material allows fluorination of the carbon material without causing excessive exfoliation and eases attainment of a homogeneous composition. In one embodiment, carbon precursor material may have a surface area greater than 30 meters$^2$/g(m$^2$/g). In another embodiment, a surface area of greater than 50 m$^2$/g is used.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An implantable medical device comprising a battery cell comprising:
   an anode;
   a cathode which includes silver vanadium oxide and fluorinated carbon formed from a fibrous carbon precursor;
   a separator between the anode and the cathode; and
   an electrolyte for activating the anode and the cathode; and
   wherein the fluorinated carbon exhibits an XRD pattern comprising:
      an area ratio of a 110 peak relative to a 001 peak of $\geq 4.52\%$; and
      a position of a 001 peak centered at $\geq 13.06° \ 2\theta_{001}$ Cu Kα.

2. The device of claim 1 wherein the fluorinated carbon is formed from a fibrous carbon precursor that possesses $\geq 95\%$ carbon.

3. The device of claim 2 wherein the fluorinated carbon is formed from a fibrous carbon precursor that possesses $\geq 99\%$ carbon.

4. The device of claim 1 wherein the fluorinated carbon is formed from a carbon precursor that possesses carbon 002 peak width in the XRD pattern of the carbon precursor $\geq 1°$ Cu Kα2θ.

5. The device of claim 4 wherein the fluorinated carbon is formed from a carbon precursor that possesses carbon 002 peak width in the XRD pattern of the carbon precursor $>3°$ Cu Kα2θ.

6. The device of claim 1 wherein the fluorinated carbon includes a fluorine weight percentage of greater than or equal to 61%.

7. The device of claim 6 wherein the fluorinated carbon includes a fluorine weight percentage of greater than or equal to 63%.

8. The device of claim 6 wherein the fluorine weight percentage (%) of greater than or equal to 61% provides lower cell resistance relative to a fluorine weight percentage (%) of less than 61%.

9. The device of claim 1 wherein the fluorinated carbon exhibits less than 5% of free carbon.

10. The device of claim 1 wherein the fluorinated carbon exhibits a position of a 001 peak in the XRD pattern such that $13.06° \leq 2\theta_{001}$ Cu Kα $\leq 13.7°$.

11. The device of claim 1 wherein the fluorinated carbon exhibits 110 peak area relative to a 001 peak in the XRD pattern $\geq 5.90\%$.

12. The device of claim 1 wherein the area ratio for a carbon 002 peak relative to a fluorinated carbon 001 peak in the XRD pattern is $\leq 9\%$.

13. The device of claim 12 wherein the area ratio for a carbon 002 peak relative to a fluorinated carbon 001 peak in the XRD pattern is $\leq 5\%$.

14. The device of claim 13 wherein the area ratio for a carbon 002 peak relative to a fluorinated carbon 001 peak in the XRD pattern is $\leq 0.5\%$.

15. The device of claim 1 wherein the fluorinated carbon exhibits an XPS pattern comprising an area under a C—C peak relative to all carbon 1s peaks of $\leq 3.5\%$.

16. The device of claim 15 wherein the area under the C—C peak relative to all carbon 1s peaks is $\leq 1\%$.

17. The device of claim 1 wherein the area under the C—C peak relative to all carbon 1s peaks is $\leq 0.5\%$.

18. The device of claim 1 wherein the fluorinated carbon includes transition metal impurities being less than 500 parts per million and less than 1% by weight of $CF_2$ and $CF_3$.

19. An implantable medical device comprising a battery cell comprising:
   an anode;
   a cathode which includes silver vanadium oxide and fluorinated carbon formed from a fibrous carbon precursor;
   a separator between the anode and the cathode; and
   an electrolyte for activating the anode and the cathode;
   wherein the fluorinated carbon includes a fluorine weight percentage (%) of greater than or equal to 61%; and
   wherein the fluorinated carbon exhibits an XRD pattern comprising an area ratio of a 110 peak relative to a 001 peak of $\geq 4.52\%$.

20. The device of claim 19 wherein the fluorinated carbon includes a fluorine weight percentage between about 61% and 80%.

21. The device of claim 20 wherein the fluorinated carbon includes a fluorine weight percentage between about 63% and 75%.

22. The device of claim 21 wherein the fluorinated carbon includes a fluorine weight percentage between about 63% and 71%.

23. The device of claim 19 wherein the fluorinated carbon exhibits a position of a 001 peak in the XRD pattern such that $12.7° \leq 2\theta_{001}$ Cu Kα $\leq 13.7°$.

24. The device of claim 19 wherein the fluorine weight percentage (%) of greater than or equal to 61% provides lower cell resistance relative to a fluorine weight percentage (%) of less than 61%.

25. An implantable medical device comprising a battery cell comprising:
   an anode;
   a cathode which includes silver vanadium oxide and fluorinated carbon formed from a fibrous carbon precursor;

a separator between the anode and the cathode; and
an electrolyte for activating the anode and the cathode;
wherein the fluorinated carbon includes a fluorine weight percentage (%) of greater than or equal to 61%; and
wherein the fluorinated carbon exhibits an XRD pattern comprising:
an area ratio of a 110 peak relative to a 001 peak of $\geq 4.52\%$;
a position of a 001 peak centered at $\geq 13.06° \, 2\theta_{001}$ Cu K$\alpha$; and
an area ratio for a carbon 002 peak relative to a fluorinated carbon 001 peak of $\leq 5\%$.

26. The device of claim 25 wherein the fluorinated carbon exhibits a position of a 001 peak in the XRD pattern such that $13.06° \leq 2\theta_{001}$ Cu K$\alpha \leq 13.7°$.

27. The device of claim 25 wherein the fluorinated carbon exhibits an XPS pattern comprising an area under a C—C peak relative to all carbon 1s peaks of $\leq 3.5\%$.

28. The device of claim 27 wherein the area under the C—C peak relative to all carbon 1s peaks is $\leq 1\%$.

29. The device of claim 28 wherein the area under the C—C peak relative to all carbon 1s peaks is $\leq 0.5\%$.

30. The device of claim 25 wherein the fluorine weight percentage (%) of greater than or equal to 61% provides lower cell resistance relative to a fluorine weight percentage (%) of less than 61%.

31. An implantable medical device comprising a battery cell comprising:
an anode;
a cathode which includes silver vanadium oxide and fluorinated carbon formed from a fibrous carbon precursor;
a separator between the anode and the cathode; and
an electrolyte for activating the anode and the cathode;
wherein the fluorinated carbon includes a fluorine weight percentage (%) of greater than or equal to 61%; and
wherein the fluorinated carbon exhibits an XRD pattern comprising:
an area ratio of a 110 peak relative to a 001 peak of $\geq 4.52\%$;
a position of a 001 peak such that $13.06° \leq 2\theta_{001}$ Cu K$\alpha \leq 13.59°$; and
an area ratio for a carbon 002 peak relative to a fluorinated carbon 001 peak of $\leq 5\%$; and
wherein the fluorinated carbon exhibits an XPS pattern comprising an area under a C—C peak relative to all carbon 1s peaks of $\leq 0.5\%$.

32. The device of claim 31 wherein the fluorine weight percentage (%) of greater than or equal to 61% provides lower cell resistance relative to a fluorine weight percentage (%) of less than 61%.

* * * * *